United States Patent [19]

Ikeda et al.

[11] Patent Number: 5,213,834
[45] Date of Patent: May 25, 1993

[54] LOW CALORIE PROCESSED FOOD MADE WITH GEL-PARTICLES OF GLUCOMANNAN COAGULUM

[75] Inventors: Masayuki Ikeda, Saitama; Seiki Harada, Kanagawa, both of Japan

[73] Assignee: Uni Colloid Kabushiki Kaisha, Kanagawa, Japan

[21] Appl. No.: 761,154

[22] Filed: Sep. 17, 1991

[30] Foreign Application Priority Data

| Oct. 5, 1990 [JP] | Japan | 2-266483 |
| Jun. 3, 1991 [JP] | Japan | 3-157372 |
| Jul. 10, 1991 [JP] | Japan | 3-194985 |

[51] Int. Cl.$^5$ .............................................. A23J 1/12
[52] U.S. Cl. ..................................... 426/573; 426/578; 426/804
[58] Field of Search ............... 426/804, 573, 575, 590, 426/578

[56] References Cited

U.S. PATENT DOCUMENTS

| 4,427,704 | 1/1984 | Cheney | 426/574 |
| 4,582,714 | 4/1986 | Ford | 426/569 |
| 4,676,976 | 6/1987 | Toba | 426/573 |
| 4,746,528 | 5/1988 | Prest | 426/573 |
| 4,844,913 | 7/1989 | Ogawa | 426/648 |
| 4,876,103 | 10/1989 | Kawano | 426/804 |
| 4,894,250 | 1/1990 | Musson | 426/573 |
| 5,049,401 | 9/1991 | Harada | 426/573 |

FOREIGN PATENT DOCUMENTS

| 57-50864 | 3/1982 | Japan | 426/804 |
| 62-190058 | 8/1987 | Japan | 426/573 |
| 62-272952 | 11/1987 | Japan | 426/573 |
| 63-71158 | 3/1988 | Japan | 426/573 |
| 63-301758 | 12/1988 | Japan | 426/573 |
| 1-101861 | 4/1989 | Japan | 426/804 |
| 1-262770 | 10/1989 | Japan | 426/573 |
| 2-23837 | 1/1990 | Japan | 426/573 |
| 2-46260 | 8/1990 | Japan | 426/804 |
| 2-15544 | 12/1990 | PCT Int'l Appl. | 426/578 |
| 2219803 | 12/1989 | United Kingdom | 426/573 |

*Primary Examiner*—Carolyn Paden
*Attorney, Agent, or Firm*—Jordan and Hamburg

[57] ABSTRACT

A low-calorie food or foodstuff includes chopped gel-particles of a neutral, complete coagulum including glucomannan as a main component. Such foods include drinks such as fruit drinks, fluid foods such as a potage, and solid foods in coexistence with a natural polysaccharide or edible emulsifier, such as jam, custard pudding and meat balls. The low-calorie foodstuff retains the original particular touch or taste of a food including the gel-particles.

6 Claims, No Drawings

LOW CALORIE PROCESSED FOOD MADE WITH GEL-PARTICLES OF GLUCOMANNAN COAGULUM

BACKGROUND OF THE INVENTION

The present invention relates to a low-calorie foodstuff for processed food comprising gel-particles of glucomannan coagulum and also a low-calorie processed food comprising gel-particles of glucomannan coagulum. In particular, the present invention relates to functional foods (the word "functional food" having recently become common) and provides a dietary fiber food component having, e.g., the functions of reducing cholesterol levels, of normalizing blood sugar levels and of normalizing defecation, in addition to being a source of nutrition.

Konjac normally is a Japanese traditional and thermally irreversible food in which konjac flour is swollen with water and coagulated with alkali. A main component of konjac is glucomannan. Glucomannan provides an excellent indigestible dietary fiber of molecules having a molecular weight of several hundred thousand and consisting of glucose and mannose. Konjac has been traditionally used as a food. However, since it requires strong alkalinity in coagulation, an alkali and an alkaline smack remain in konjac, which has restricted the uses of konjac. Konjac coagulum, which is thermally irreversible, is not melted by heating. Konjac coagulum, which is elastic, cannot be made into a paste by grinding.

Generally, the so-called konjac paste comprises an incomplete coagulum of swollen glucomannan. In the past, processes of blending konjac paste with a foodstuff to produce a low-calorie food have been disclosed and all of these processes employ an incomplete coagulum of glucomannan.

The incomplete coagulum of glucomannan, which develops a binding force in a coagulation of konjac paste, can be blended with a different foodstuff. A food blended with konjac paste has essentially the same form as the corresponding original food. However, the glucomannan component of the food gives the food a glue-like touch which also deteriorates the taste of the food. An incomplete glucomannan coagulum blended with a drink thickens the drink so that a light physical property and a touch peculiar to the drink are lost.

On the other hand, a konjac full-coagulum is peculiarly elastic, and thus it is almost impossible to grind and make paste of the konjac full-coagulum. Therefore, konjac full-coagulum is chopped to provide a paste-like foodstuff. The resulting body of gel-particles of konjac full-coagulum has a paste-like appearance but the physical property of the body of gel-particles is different in essence from a paste of incomplete konjac coagulum. The body of gel-particles of konjac full-coagulum has no binding force and blends poorly with a different foodstuff, so that it cannot retain a mixture of the gel-particles and the different foodstuff in the form of a single solid food, even though it does not provide a glue-like touch to deteriorate the taste of the food. Since a food blended with gel-particles of konjac full-coagulum tends to exude water during preservation of the food, the blending capacity of gel-particles of konjac full-coagulum is only 5% of the total amount of the food. Even if gel-particles of konjac full-coagulum are forcibly blended, the blending capacity thereof is only 10% of the total amount of the food. A food with 10% of gel-particles of konjac full-coagulum provides an insufficient low-calorie food.

SUMMARY OF THE INVENTION

According to the present invention, a body of powder of a neutralized full-coagulum in the form of a sol consisting essentially of glucomannan (referred to as gel-particles of glucomannan coagulum herein) is a thermally irreversible gel. Gel-particles of glucomannan coagulum disperse in water and cannot deteriorate a peculiar touch of a food blended with the gel-particles because of the dispersibility and size of each of the gel-particles. Blending the gel-particles with a different foodstuff and a natural gum in order to produce a binding force having no adverse effect on the touch of a final product including the gel-particles, stabilizes a blended dispersion of the gel-particles, the different foodstuff and the natural gum. For example, the gel-particles give a syneresis prevention effect, a water-holding effect, a thickening force, a gelling force and a freezing-and-thawing resistance. Application of an emulsifying substance (i.e., emulsifier in a broad sense) to a foodstuff including a fat, sufficiently stabilizes the foodstuff. Therefore, displacing a lot of foodstuff contained in a food with gel-particles of glucomannan coagulum of the present invention cannot deteriorate the touch or taste of the food including the gel-particles but can easily retain the food in a single solid form.

In particular, fine gel-particles of glucomannan coagulum of the present invention cannot deteriorate a light touch of a drink. Blending the fine gel-particles and water with a drink provides a drink of an excellent taste, which conventional blending materials such as starchy, proteinaceous and fatty materials cannot provide. In this case, each gel-particle of the glucomannan coagulum has a fine particle size such as 150 Tyler mesh pass.

In the case of a viscous fluid food such as a potage, gel-particle of glucomannan coagulum having a particle size such as 8-160 Tyler mesh pass give fluidity to the food, which can give the food body and keep the viscosity of the food constant when cooling the food.

Since a body of gel-particles of glucomannan coagulum according to the present invention is a swollen coagulum including water having a weight 30-50 times the weight of the glucomannan, it serves as a functional food essentially equal to the case in which water having a weight 30-50 times the weight of the glucomannan operates in the human stomach and intestines. This provides a superior advantage to cellulose, which itself deteriorates the touch of a food, is difficult to take in and cannot be gelled with water whereby it serves as a functional food only in proportion to the weight of cellulose.

DESCRIPTION OF THE PREFERRED EMBODIMENTS

The present invention is characterized in that a thermally irreversible coagulum consisting essentially of glucomannan is cut into gel-particles, the pH value of the gel-particles is controlled to be essentially neutral, and preferably a natural gum and/or emulsifier are blended with the gel-particles.

Glucomannan is a main component of konjac. Konjac flour winnowed from konjac tuber provides a raw material for konjac. A konjac coagulum in which a konjac tuber is ground to gel-particles and the gel-particles are coagulated with an alkali may also provide a raw material for konjac. 8-160 Tyler mesh gel-particles from a cut, thermally irreversible coagulum consisting essentially of konjac or glucomannan of the present invention are preferably blended with a relatively viscous fluid food. On the other hand, 150 Tyler mesh pass gel-particles of glucomannan coagulum are preferably blended with a light, low-viscous drink.

Foods of the present invention fall into various categories. Solid foods of the present invention comprise products of domestic animal meat such as ham and sausage, products of fish meat such as boiled fish paste and fried fish balls, products of minced meat such as hamburger steak, a "harumaki" and a meat ball, tasty foods such as jam and a custard pudding, and products of wheat flour and or rice flour such as noodles, cookies, breads, rice sweets and snacks.

Generally, drinks are foods. However, drinks are distinguished from fluid foods herein for the purpose of definitely defining the present invention. That is, a drink is defined as a low-viscous liquid which can be swallowed in a gulp, like water, but which does not give a feeling of fullness, such as fruit juice, a fruit-juice drink, coffee, cocoa, black tea, milk, fermented milk and colas. On the other hand, a fluid food is defined as a semifluid nutriment of a high viscosity and a body which can give a sufficient feeling of fullness when swallowed. Fluid foods comprise dairy products such as potages, spreads, ice cream, yogurt, soft butter and soft cheese, pulp-containing drinks such as tomato juice, seasonings such as catsup, mayonnaise and sauces, curry, and stew. Gel-particles of glucomannan coagulum used as a foodstuff of the present invention are made from a coagulum in which an alkali such as lime, caustic soda, caustic potash or sodium carbonate is added to a swollen liquid of glucomannan or konjac flour to produce a mixture which is then coagulated by heating. In this case, blending with glucomannan a natural gum such as carrageenan, sodium alginate or agar, a protein such as soybean protein, or cellulose, effectively gives elasticity to and enhances the touch of the konjac or glucomannan coagulum.

In the present invention, a full coagulum consisting essentially of glucomannan is chopped into gel-particles. The cutting means is not restricted. However, a food cutter having a rotary cutter driven by a motor, e.g., COMITROL (a trademark of such a cutting machine of the Arshell Co., U.S.A.) preferably provides the cutting means. Since a cutting machine having a high-pitched or fine-eyed cutting head produces fine gel-particles of glucomannan coagulum, it is preferable.

Particle sizes of the gel-particles of glucomannan coagulum depend on the desired applications thereof. When applied to a solid food, gel-particles of glucomannan coagulum have large enough particle sizes that an eater will not sense the touch of konjac, which is generally a 16-200 Tyler mesh pass size. When applied to a drink, each of the gel-particles has a 150 Tyler mesh pass particle size, preferably a 180 Tyler mesh pass particle size and more preferably a 200 Tyler mesh pass particle size. When applied to a fluid food, each of the gel-particles has a particle size range of 8 Tyler mesh pass but 160 Tyler mesh stop, and preferably a particle size range of 16 Tyler mesh pass but 100 Tyler mesh stop.

A particle size distribution was obtained in such a manner that 200 g of sample gel-particles of glucomannan coagulum were first placed on an 8 Tyler mesh standard sieve with a 20 cm diameter (produced by Takano Rika Glass K. K.), the sieve was then manually shaken in running water so that the sieve passed part of the sample gel-particles and stopped the remaining part thereof to separate the sample gel-particles into two classes, each of the two classes was weighed, and the passing sample gel-particles were repeatedly subjected to the same operation using a one-class smaller eyed Tyler mesh standard sieve as described above, whereby the apparent particle sizes of the sample gel-particles were measured.

Since a process for producing glucomannan coagulum comprises the steps of swelling konjac flour or gel-particles of glucomannan with water having a weight about 20-50 times the weight of the konjac flour or the gel-particles of glucomannan and then adding an alkali to the resulting mixture, glucomannan coagulum is, of course, alkaline. Gel-particles of glucomannan coagulum are also alkaline. The pH value of gel-particles of glucomannan coagulum is controlled to be essentially neutral so as to enhance the touch of the gel-particles as a food.

In a neutralization method for gel-particles of glucomannan coagulum, acid microcapsules, each constituted of a core having a melting point higher than the coagulation temperature of glucomannan, which encapsulates an organic acid, are blended with raw glucomannan gel-particles or konjac flour when the raw gel-particles or the flour are dissolved, and the mixture of the gel-particles or the flour and the acid microcapsules is heated to or above the melting point of the core of the microcapsule after the raw glucomannan gel-particles or the konjac flour have coagulated, so that the organic acid is released from the acid microcapsules to neutralize the alkali of the resulting glucomannan coagulum. In addition, an organic acid such as acetic acid, citric acid, succinic acid, malic acid or fumaric acid may be added to gel-particles of glucomannan coagulum derived from finely chopped ordinary alkaline glucomannan coagulum to produce a mixture which is neutralized by stirring. Binders used with the present invention comprise natural gums. A low-calorie process food of the present invention includes as a binder at least one of carrageenan, locust bean gum, guar gum, alginic acid, sodium alginate, glucomannan, xanthane gum, cyclodextrin, tamarind seed polysaccharides, agar, pullulan, pectin, curd run and cuticle.

The blended amount of natural gum is 0.05-10% by weight of the gel-particles of glucomannan coagulum and preferably about 0.1-5.0% thereof. More than 10 wt% of natural gum adds the taste of a glue to the mixture of gel-particles of glucomannan coagulum and the binder and deteriorates the touch of a food comprising the mixture. Less than 0.05 wt% of natural gum cannot produce coherence in the mixture.

Edible emulsifiers which may be used as a food and have an emulsification force may be used with the present invention. The edible emulsifiers comprise, e.g., fatty acid esters such as propylene glycol fatty acid esters, glycerin fatty acid esters, saccharose fatty acid esters and sorbitan fatty acid esters, emulsifiers contained in natural foods such as soybean phospholipid, egg yolk and milk casein, and natural polymer derivatives such as carboxymethyl cellulose and methyl cellulose. The present invention uses at least one of these emulsifiers. The blended amount of the emulsifier is 0.05-10% by weight of the gel-particles of glucomannan coagulum and preferably about 0.1-5.0% thereof. More than 10 wt % of emulsifier deteriorates the touch of a food comprising the mixture of gel-particles of glucomannan coagulum and the emulsifier. On the other hand, less than 0.05 wt % of emulsifier cannot produce coherence in the mixture. A natural gum and an edible emulsifier may be added together to gel-particles of glucomannan coagulum.

In producing foodstuffs of the present invention, hydrogencarbonate, sweetener, seasoning, spices, perfume and/or pigment may be appropriately added in addition to the components described above to synergetically stabilize physical properties of the foodstuff.

EXAMPLE 1

An about 25/1 amount by weight of water was added to 20 g of konjac flour to swell the konjac flour. Lime was added to the swelling konjac flour to produce 520 g of a relatively hard body of konjac. The body of konjac was cut into cubes having about 1 cm sides. A food cutter was used to chop the cubes of konjac for 10 min into konjac gel-particles of 32 Tyler mesh pass. Citric acid was added to the konjac gel-particles to control the pH value of the resulting mixture to be 6.5–7.0. 0.5 g of $\lambda$-carrageenan and 0.3 g of locust bean gum were added to this mixture to produce a second mixture. The second mixture was stirred for 2 min to produce a low-calorie foodstuff. 500 cc of this foodstuff was left as is at room temperature for 24 hr. The foodstuff separated 1–2 vol % of water after 24 hr.

CONTROL 1

A CONTROL 1 foodstuff differed from the EXAMPLE 1 foodstuff only in that the CONTROL 1 foodstuff lacked $\lambda$-carrageenan and locust bean gum. The foodstuff separated 20–25 vol % of water.

EXAMPLE 2

100 g of corn oil, 1 g of soybean phospholipid and 500 mg of saccharose fatty acid ester instead of $\lambda$-carrageenan and locust bean gum were added to the first mixture (i.e., gel-particles of neutral glucomannan coagulum) of EXAMPLE 1 to produce a mixture. This mixture was stirred at high speed for 5 min to produce a foodstuff. 500 cc of this foodstuff was left as is at room temperature for 24 hr. All of the gel-particles of glucomannan coagulum, the water, the corn oil, soybean phospholipid and the saccharose fatty acid ester were essentially homogenized after 24 hr.

CONTROL 2

A CONTROL 2 foodstuff differed from the EXAMPLE 2 foodstuff only in that the CONTROL 2 foodstuff lacked soybean phospholipid and saccharose fatty acid ester. The gel-particles of glucomannan coagulum, the water and the corn oil were separated in a vol % ratio of 60:20:20.

EXAMPLE 3

0.3–2.0 wt % of each of alginic acid, sodium alginate, guar gum, glucomannan and tamarind seed polysaccharide were added instead of $\lambda$-carrageenan and locust bean gum to the gel-particles of glucomannan coagulum of EXAMPLE 1 to produce a foodstuff. The foodstuff was left as is in the same manner as in EXAMPLE 1. EXAMPLE 3 had essentially the same result as EXAMPLE 1.

EXAMPLE 4

50 kg of the glucomannan coagulum of EXAMPLE 1 was chopped into gel-particles. 20 g of xanthane gum was added to the gel-particles of glucomannan coagulum to produce a mixture. This mixture was stirred at high speed for 2 min to produce a second mixture. A centrifugal separator was used to dewater the second mixture so as to remove free water therefrom. 25 kg of a foodstuff was finally obtained.

A strawberry jam was produced using this foodstuff and the following other materials in the following manner:

| EXAMPLE 4 foodstuff | 25 kg |
| --- | --- |
| Strawberries | 25 kg |
| High methoxypectin | 0.3 kg |
| Sugar | 60 kg |
| 50% citric acid solution | 0.5 l |
| Total | 110.8 kg |

The foodstuff of EXAMPLE 4 and strawberries were injected into an open steam boiler and steamed to produce a first mixture. Sugar was added to the first mixture while the first mixture was stirred, to produce a second mixture. The second mixture was boiled down until the amount of the edible solid part was 69–70% of the amount of the second mixture. The boiled-down mixture was further stirred while high methoxypectin was added thereto. Boiling of the boiled-down mixture was continued until the amount of the edible solid part was 65% of the amount of the second mixture. Then, heating the boiled-down mixture was stopped. Then, a 50% citric acid solution was added to the boiled-down mixture while the boiled-down mixture was violently stirred whereby a third mixture was obtained. The third mixture was sealed in a bottle with a 250 g capacity in such a manner that the bottle was quickly filled therewith at 85° C. or higher and then sealed. The bottle was cooled and left as is, resulting in a bottled final product. The bottled final product weighed 99.3 kg. 50 kg of strawberries are conventionally used in such a process. However, the foodstuff of EXAMPLE 4 replaced 25 kg of conventional strawberries, which reduced by 10% or more the calories in the bottled final product in relation to a conventional strawberry jam. In addition, the final product of EXAMPLE 4 had essentially the same touch as a strawberry jam including 100% strawberries as the core of the jam.

EXAMPLE 5

A foodstuff of EXAMPLE 5 differed from the foodstuff of EXAMPLE 1 only in that 1 kg of glucomannan coagulum was chopped into gel-particles, 5 g of $\kappa$-carrageenan was added to the gel-particles of glucomannan coagulum to obtain a mixture of them and the mixture was stirred at high speed for 3 min.

A milk custard pudding was produced using the foodstuff of EXAMPLE 5 in the following manner:

| EXAMPLE 5 foodstuff | 800 g |
| --- | --- |
| Skimmed milk powder | 150 g |
| Sugar | 100 g |
| Brandy | a proper quantity |
| A spice | a proper quantity |
| A coloring matter | a proper quantity |

Sugar and skimmed milk powder were added to the foodstuff to produce a liquid mixture, which was heated to 80° C. while stirred. Then, brandy, the spice and the coloring matter were added to the liquid mixture to produce a second liquid mixture, which was slowly stirred, then poured into a custard pudding cup and cooled. The resulting milk custard pudding had 20% fewer calories than a conventional milk custard pudding comprising milk and whole egg without the inventive foodstuff. The touch of the milk custard pudding of EXAMPLE 5 had a sufficient body, which was equal to a conventional milk custard pudding. A similar foodstuff with agar or curd run instead of κ-carrageenan produced essentially the same milk custard pudding as the foodstuff with κ-carrageenan.

EXAMPLE 6

In the same manner as in EXAMPLE 1, 10 kg of glucomannan coagulum was chopped to gel-particles. A centrifugal separator eliminated free water from the gel-particles of glucomannan coagulum. 10 g of cyclodextrin and 2 g of glycerin fatty acid ester as emulsifier were added to the dewatered gel-particles of glucomannan coagulum to produce an emulsion. This emulsion was stirred at high speed for 5 min to produce a smooth paste.

1 kg of the paste was added to 2 kg of minced pork and sufficiently stirred together therewith whereby 3 kg of a foodstuff of the present invention was obtained. A dish of minced meat was cooked using the foodstuff of EXAMPLE 6 in the following manner:

400 g of finely chopped onion was fried in 150 g of butter and then cooled. Then, 3 kg of the foodstuff of EXAMPLE 6, 300 g of bread crumbs, 500 g of whole egg, 25 g of salt, a pepper and 150 g of wheat flour were mixed with the fried finely-chopped onion to produce a mixture for meat balls.

On the other hand, there were cooked low-calorie dishes of minced meat such as "harumakies" including a base content comprising a mixture of 2 kg of minced beef and 1 kg of the mixture for meat balls, as well as fried meat cakes, hamburger steaks and meat balls all including a base comprising a mixture of 2 kg of jointly minced meats and 1 kg of the mixture for meat balls. In each of the dishes of minced meat, the foodstuff of EXAMPLE 6 was easily intimately mixed with minced meat. The taste of each of the dishes of minced meat of EXAMPLE 6 was equal to that of a conventional dish of minced meat including all minced meat instead of the foodstuff of EXAMPLE 6.

EXAMPLE 7

75 g of glucomannan, 5 g of carrageenan and acid microcapsules in which 0.8 g of hardened soybean oil cover 3.2 g of citric acid in granular form were blended with one another in the form of gel-particles. Then, 2.5 l of warm water at 50° C. was added to the blend, which was slowly stirred for 5 minutes to be homogenized and was left as is at room temperature for 60 min. to swell. An alkaline solution in which 2 g of caustic soda (food additives grade) is dissolved in 200 ml of water was added to the resulting swelling liquid to produce a mixture. This mixture was quickly stirred to produce a homogeneous paste.

A rectangular stainless steel vessel having a size of 25 cm length, 20 cm width and 6 cm height was used to receive and seal the paste therein. Then, a thermostat, the operating temperature of which was set at 65° C.±2° C., was used to heat the paste contained in the vessel for 30 min to gel the paste and then the operating temperature of the thermostat was increased to 75° C. so that the thermostat held the paste contained in the vessel at 75° C. for 10 min. The resulting coagulum was essentially chemically neutral. This coagulum was first diced. Then, a cutting machine including a cutting head with 22.9 ∞m apertures chopped the coagulum to produce sufficiently chopped gel-particles of glucomannan coagulum free from alkaline smack. Even the addition to a drink of a large amount of the gel-particles of glucomannan coagulum retained a smooth touch in the drink. All gel-particles of the glucomannan coagulum passed through a 250 Tyler mesh sieve.

A fruit drink was produced using gel-particles of glucomannan coagulum and the following other materials:

| | |
|---|---|
| Gel-particles of glucomannan coagulum | 800 g |
| 100% orange juice | 800 g |
| Sugar | 400 g |
| Citric Acid | 5 g |
| Sodium citrate | 4 g |
| A spice | a proper quantity |
| A coloring matter | a proper quantity |

These materials were sufficiently blended with one another, then flash pasteurized by a platelike heater at 90° C. for 8 seconds and then poured into a plurality of previously pasteurized aluminum cans with a 350 ml capacity. These cans were sealed and cooled to provide canned final products of fruit juice. A person drinking the final product of fruit juice perceived no foreign feeling in his mouth but a light touch. 100% apple, grapefruit or melon juice instead of 100% orange juice provided fruit drinks of essentially the same light touch as the fruit drink using 100% orange juice.

EXAMPLE 8

A chocolate milk was produced using the gel-particles of glucomannan coagulum of EXAMPLE 7 and the following other materials:

| | |
|---|---|
| Gel-particles of glucomannan coagulum | 500 g |
| Raw milk (including 1.5% of a fatty inqredient) | 420 g |
| Sugar | 60 g |
| Cocoa powder | 16 g |
| Carrageenan (produced by Chuo Kasei K.K.) | 0.2 g |

All of these materials other than the raw milk were previously blended with one another and then dispersed in the raw milk. The resulting mixture was heated to 75° C. and then UHT (Ultra-High Temperature) pasteurized at 145° C. for 2 seconds. The pasteurized mixture was cooled to 75° C., then homogenized and then cooled again to 20° C. The cooled mixture was aseptically charged into a plurality of previously pasteurized aluminum cans with a 350 ml capacity. The touch of the resulting chocolate milk was essentially equal to or lighter than that of a conventional chocolate milk.

EXAMPLE 9

75 g of glucomannan and 5 g of carrageenan were blended with each other in the form of gel-particles. 2.5 l of warm water at 50° C. was added to the resulting mixture to produce a fluid mixture. The fluid mixture was slowly stirred for 5 minutes to be homogenized and was left as is at room temperature for 60 minutes to swell. An alkaline solution in which 2 g of caustic soda (food additives grade) is dissolved in 200 ml of water was added to the resulting swelling fluid to produce a mixture. This mixture was quickly stirred to produce a homogeneous paste.

A rectangular stainless steel vessel having a size of 25 cm length, 20 cm width and 60 cm height was used to receive and seal the paste therein. Then, a thermostat, the operating temperature of which was set at 80° C., was used to heat the paste contained in the vessel for 30 min to produce a thermally irreversible coagulum.

This coagulum was diced. Then, the dice-shaped coagulums were placed in a bowl of a cutting mixer (with a 10 l capacity and a 1.0 kW motor). The cutting mixer chopped the dice-shaped coagulums at 3,000 RPM for 3 minutes to produce gel-particles of glucomannan coagulum leaving no foreign feeling on a human tongue. The pH value of the gel-particles of glucomannan coagulum was 11.2 and had a strong alkaline smack, which is not preferred as a foodstuff. Therefore, 3.2 g of citric acid was added to the gel-particles of glucomannan coagulum to produce a mixture. The cutting mixer stirred this mixture at 1,500 RPM for 2 minutes to neutralize the alkali of the gel-particles of glucomannan coagulum and produce gel-particles of glucomannan coagulum free from alkaline smack and providing a fluid food base having a smooth touch. The last gel-particles of glucomannan coagulum were classified so that 80% or more thereof belonged to a class of 8 Tyler mesh pass but 32 Tyler mesh stop.

Corn potage for four persons was produced using the classified gel-particles of glucomannan coagulum and the following other materials:

| | |
|---|---|
| Gel-particles of glucomannan coagulum | 250 g |
| Corn paste | 60 g |
| Consomme (product on the market) | 1 cup |
| Butter | 2 large spoons |
| Wheat flour | 4 large spoons |
| Milk | 1 cup (180 ml) |
| Salt and pepper | a small quantity of each |
| Cream | 2 large spoons |
| Corn kernels | a small quantity |

Butter was placed in a thick-walled pan, which was over a slow fire to melt the butter. Wheat flour was added to the melting butter in the pan to produce a mixture. This mixture was stirred by means of a wood scoop for 5–6 minutes. Then, milk and consomme were so carefully and slowly added to the contents of the pan that they did not produce undissolved lumps. Then gel-particles of glucomannan coagulum and corn paste were added to the contents of the pan. The resulting contents of the pan were sufficiently stirred. Then, salt and pepper and then cream were added to the contents of the pan to finish the fluid part of a corn potage. Finally, corn kernels were added as floating pieces of solid food to the fluid part of the corn potage to produce a final product of corn potage. This corn potage had a light tough having body. The viscosity of the corn potage increased at high temperature but decreased at low temperature while the viscosity of a conventional corn potage increased at low temperature. Thus, the corn potage of EXAMPLE 9 was tasty at both high and low temperatures.

EXAMPLE 10

Potage of shiitake (i.e., a kind of Japanese mushroom) and tofu (i.e., bean curd) for four persons was produced using the gel-particles of glucomannan coagulum of EXAMPLE 9 and the following other materials:

| | |
|---|---|
| Gel-particles of glucomannan coagulum | 250 g |
| Shiitakes (each dry shiitake reconstituted with water being divided into four) | 10 |
| Bean curd (cut into cubes with 2 cm sides with a 4 cm thickness, a 7 cm width and a 10 cm height | 1 block |
| Slices of bamboo shoot | 50 g |
| Welsh onion (in chopped form) | 1 |
| Ginger (in sliced form) | ½ |
| Chicken bone soup | 5 cups |
| Salt | 2 small spoons |
| Sake | 2 small spoons |
| Pepper | a small quantity |

Shiitakes and slices of bamboo shoot were added to chicken bone soup to produce a mixture, which was then boiled for 15 minutes. Then, bean curd was added to the boiled mixture. Gel-particles of glucomannan coagulum and then salt, pepper and sake were added to the boiled mixture to season the resulting mixture. Once this mixture reached a boil, the fire was extinguished. The touch of the potage in EXAMPLE 10 was light.

EXAMPLE 11

Carrot potage for two persons was cooked in essentially the same manner as in EXAMPLE 8 but different from EXAMPLE 8 in that neutral konjac gel-particles consisting of 80% or more of gel-particles of glucomannan coagulum belonging to a class of 16 Tyler mesh pass but 100 Tyler mesh stop were used:

| | |
|---|---|
| Gel-particles of glucomannan coagulum | 150 g |
| Carrot paste | 50 g |
| Consomme (product on the market) | 1 cup (180 ml) |
| Salt and pepper | a small quantity of each |
| Cream | ¼ cup |

Gel-particles of glucomannan coagulum, carrot paste and consomme were put in a pan. The pan was placed over an intermediate fire so as not to scorch the contents of the pan. The contents were seasoned with salt and pepper. Then, cream was added to the contents of the pan. The pan continued to be heated over a weaker fire for about 10 min whereby a carrot potage of an improved touch was obtained. The touch of the carrot potage of EXAMPLE 11 was slightly more viscous than those of the foodstuffs of EXAMPLES 1 AND 2.

TEST 1

Each of 10 constipated patients (four men and six women) ate 200 g of carrot potage of EXAMPLE 11 each morning. Five constipated patients (two men and three women) restored their normal defecations after five days. Two female patients restored their normal defecations after 10 days. Two male patients essentially restored their normal defecations after 20 days. One female patient failed to restore her normal defecation even after one month, but her constipation was significantly reduced.

TEST 2

Three men and three women of 30 or more with a ponderal index ate 200 g of carrot potage of EXAMPLE 11 at each breakfast and each supper. 20–50% of the ponderal indices of all of the six were cut after one month. It is assumed that since eating the 200 g of carrot potage of EXAMPLE 11 gives a significant feeling of fullness, each of the six was caused to reduce the total amount of the meal. The amount of the component of 200 g of carrot potage of EXAMPLE 11 serving as a dietary fiber is about 50 g, which is equal to 5 times the 10 g lower limit of the amount of dietary fiber required for a normal adult each day.

EXAMPLE 12

Vanilla ice cream was produced using gel-particles of glucomannan coagulum different from that of EXAMPLE 11 only in that gel-particles of glucomannan coagulum of EXAMPLE 12 had a particle size distribution in which 90% or more of the gel-particles belonged to a class of 32 Tyler mesh pass but 100 Tyler mesh stop, and the following other materials:

| Gel-particles of glucomannan coagulum | 150 g |
|---|---|
| Yolks | 2 |
| Sugar | 60 g |
| Raw milk | 1 cup (180 ml) |
| Gel-particles of gelatin | 5 g |
| Cream | ½ cup |
| Vanilla essence | 2 small spoons |
| Brandy | 2 large spoons |

First, yolk and sugar were put in a pan and blended well with each other by means of a wood scoop. Once the sugar dissolved, raw milk was added to the contents of the pan and then the pan was placed over a slow fire. Gel-particles of gelatin were then added to and dissolved in the contents of the pan. A filter then filtered the contents of the pan. Gel-particles of glucomannan coagulum were added to the part of the contents passing through the filter to produce a mixture, which was then cooled.

Cream was put in a separate bowl, foamed while cooled and poured into the mixture to produce a second mixture. Vanilla essence and brandy were added to the second mixture so as to flavor it. This flavored mixture was placed in a refrigerator for a day and a night to produce vanilla ice cream. The vanilla ice cream produced no foreign feeling on the human tongue and had a smooth touch.

EXAMPLE 13

A pulp-containing drink was produced using gel-particles of glucomannan coagulum of EXAMPLE 9 different from that of EXAMPLE 9 only in that the gel-particles of EXAMPLE 13 had a particle size distribution in which 70% or more of the gel-particles belonged to a class of 16 Tyler mesh pass but 60 Tyler mesh stop, and the other following materials:

| Gel-particles of glucomannan coagulum | 100 g |
|---|---|
| Strawberries washed with water and having no calycles | 150 g |
| Raw milk | 20 g |
| Sugar | 15 g |

A juicing mixer produced a strawberry pulp-containing drink from all of the materials. This strawberry pulp-containing drink had a refrigerant grainy touch which a conventional strawberry pulp-containing drink could not have. Orange, apple, pineapple or grapefruit instead of strawberry also produced a pulp-containing drink having a good touch.

EXAMPLE 14

30 g of gel-particles of glucomannan coagulum with a particle size distribution in which 80% or more of the gel-particles belonged to a class of 8 Tyler mesh pass but 16 Tyler mesh stop was added to 100 g of yogurt sold on the market to produce a mixture, which was then stirred. The yogurt of EXAMPLE 14 had a peculiar touch.

The foregoing detailed description is to be clearly understood as given by way of illustration and example only, the spirit and scope of the present invention being limited solely by the appended claims.

We claim:

1. A method of making a low-calorie foodstuff, comprising mixing organic acid microcapsules, gel-particles consisting essentially of glucomannan and water in a weight ratio of water to gel-particles of about 20:1 to 50:1, each of the microcapsules having a core having a melting point higher than a temperature at which alkaline glucomannan coagulates to form a thermally irreversible coagulum, adding alkali to the mixture thereby to produce an alkaline mixture, heating the alkaline mixture to a temperature at which the glucomannan coagulates to form a thermally irreversible coagulum, said heating melting the core of each of the microcapsules thereby to neutralize the coagulum and form a body of neutral glucomannan gel therefrom, and chopping the gel into neutral glucomannan gel-particles of size 200 Tyler pass or less.

2. The method of claim 1, wherein said chopping produces gel-particles having a particle size of 180 Tyler mesh pass or less.

3. The method of claim 1, wherein said chopping produces gel-particles having a particle size of 150 Tyler mesh pass or less.

4. The method of claim 1, wherein said chopping produces gel-particles having a particle size ranging from 16 Tyler mesh pass to 200 Tyler mesh pass.

5. The method of claim 1, wherein said chopping produces gel-particles having a particle size ranging from 8 Tyler mesh pass to 160 Tyler mesh stop.

6. The method of claim 1, wherein said chopping produces gel-particles having a particle size ranging from 16 Tyler mesh pass to 100 Tyler mesh stop.

* * * * *